US009923396B2

(12) United States Patent
Lei et al.

(10) Patent No.: US 9,923,396 B2
(45) Date of Patent: Mar. 20, 2018

(54) USB CHARGER, MOBILE TERMINAL AND CHARGING METHOD THEREOF

(71) Applicant: Spreadtrum Communications (Shanghai) Co., Ltd., Zhangjiang, Shanghai (CN)

(72) Inventors: Peng Lei, Shanghai (CN); Liangjin Chen, Shanghai (CN); Wangping Liang, Shanghai (CN); Guobing Luan, Shanghai (CN); Fuqiang Zhnag, Shanghai (CN); Mingwei Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 161 days.

(21) Appl. No.: 14/719,677

(22) Filed: May 22, 2015

(65) Prior Publication Data
US 2016/0064978 A1 Mar. 3, 2016

(30) Foreign Application Priority Data
Aug. 29, 2014 (CN) .......................... 2014 1 0438521

(51) Int. Cl.
*H02J 7/00* (2006.01)
(52) U.S. Cl.
CPC .......... *H02J 7/0052* (2013.01); *H02J 7/0004* (2013.01); *H02J 2007/0062* (2013.01)
(58) Field of Classification Search
CPC .................................................... H02J 7/0052
USPC ........................................................ 320/114
See application file for complete search history.

(56) References Cited

U.S. PATENT DOCUMENTS

| 2003/0111980 | A1 | 6/2003 | Lee | |
|---|---|---|---|---|
| 2005/0091549 | A1* | 4/2005 | Wu | G06F 1/3215 713/320 |
| 2014/0245030 | A1* | 8/2014 | Helfrich | H02M 7/04 713/300 |

FOREIGN PATENT DOCUMENTS

| CN | 103618356 A | 3/2014 |
|---|---|---|
| CN | 104007801 A | 8/2014 |
| KR | 20030050584 A | 6/2003 |

OTHER PUBLICATIONS

Chinese 1st Office Action corresponding to Patent No. 201410438521.5; Issue Date : Mar. 3, 2016, with English summary.

* cited by examiner

*Primary Examiner* — Suresh Memula
(74) *Attorney, Agent, or Firm* — Cantor Colburn LLP (57) ABSTRACT

A USB charger, a mobile terminal, and a charging method are provided. The USB charger for charging a mobile terminal, includes a first logic control unit through which bidirectional communication is established between the USB charger and the mobile terminal, wherein the first logic control unit is configured to: send, to the mobile terminal, a first signal which indicates a maximum output capability of the USB charger; receive, from the mobile terminal, a second signal which indicates magnitude of a voltage requested by the mobile terminal; adjust a voltage output from the USB charger to be consistent with the voltage requested by the mobile terminal; and transmit a clock signal between the mobile terminal. Accordingly, the USB charger and the mobile terminal can communicate through two single signal wires by way of pulse signals. Thus, the mobile terminal is charged in a fast, safe, and simply way.

9 Claims, 5 Drawing Sheets

USB CHARGER, MOBILE TERMINAL AND CHARGING METHOD THEREOF

CROSS-REFERENCE TO RELATED APPLICATIONS

The present application claims priority under 35 U.S.C. § 119 to Chinese patent application No. 201410438521.5, filed on Aug. 29, 2014, the entire disclosure of which is incorporated herein by reference.

TECHNICAL FIELD

The present disclosure generally relates to mobile communication, and more particularly, to a USB charger, a mobile terminal, and charging methods thereof.

BACKGROUND

Step-down switching power supply circuits typically have an output voltage lower than an input voltage, an output current greater than an input current, and thus an output power slightly less than an input power. Therefore, the switching power supply circuit has relatively high efficiency and low heat dissipation. Further, if the output voltage is not much different from the input voltage, the difference between the output current and the input current won't be great, either.

Figure 1:
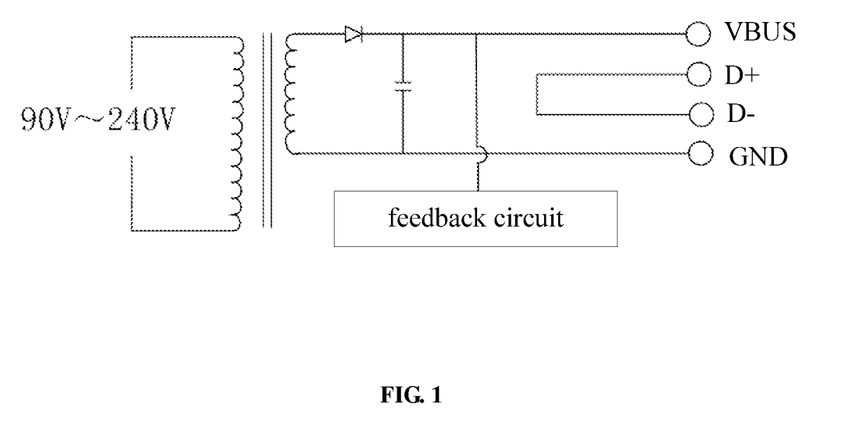
FIG. 1 schematically illustrates a circuit of an existing standard USB charger.

Referring to FIG. 1, a circuit of an existing standard USB charger is illustrated. The USB charger includes four pins which are respectively connected with a data signal wire D+, a data signal wire D−, a power wire VBUS and a ground wire GND. The USB charger is able to convert an alternating current (AC) in high voltage level into a direct current (DC) in low voltage level. The USB charger further includes a feedback circuit to control a voltage of the DC output from the USB charger. As the USB charger is a standard charger, the data signal wire D+ and the data signal wire D− are short connected, which is stipulated in USB charger protocol. Therefore, the type of the USB charger (e.g. a standard USB charger, or a non-standard USB charger such as a USB interface of a computer) is able to be determined by detecting if the data signal wire D+ and the data signal wire D− are short connected. The USB charger in the present disclosure refers to a USB charger including four pins as recited above. And the USB charger may further include an ID pin.

When taking the USB charger and a battery required to be charged as a charging circuit, an input voltage of the charging circuit refers to the voltage output from the charger, which is normally 5V, and an output voltage of the charging circuit refers to the voltage input to the battery, which is normally from 3.6V to 4.2V. Thus, a current charged into the battery (hereinafter referred to as an output current of the charging circuit) is slightly greater than a current provided by the charger (hereinafter referred to as an input current of the charging circuit).

When the battery is desired to be charged with a greater current to increase charging efficiency, the output current of the charging circuit is required to be increased. Accordingly, the input current of the charging circuit should be increased. As a result, voltage drop will be increased due to the impedances of USB signal wires and the greater input current, thus leading to a decrease in circuit output efficiency. Accordingly, in existing techniques, bulk charging is hard to be achieved, and the maximum input current is normally limited to 1.5 A.

SUMMARY

According to one embodiment of the present disclosure, a USB charger adapted to charge a mobile terminal is provided. The USB charger includes a first logic control unit through which bidirectional communication is established between the USB charger and the mobile terminal, wherein the first logic control unit is configured to: send, to the mobile terminal, a first signal which includes a maximum output capability of the USB charger; receive, from the mobile terminal, a second signal which indicates magnitude of a voltage requested by the mobile terminal; adjust a voltage output from the USB charger to be consistent with the voltage requested by the mobile terminal; and transmit a clock signal between the USB charger and the mobile terminal.

In some embodiments, the voltage requested by the mobile terminal is determined based on the maximum output capability of the USB charger and a maximum load capability of the mobile terminal. In some embodiments, the maximum output capability of the USB charger represents maximum magnitudes of voltage and current output from the USB charger.

In some embodiments, the bidirectional communication is established through a first signal wire and a second signal wire, wherein one of the two signal wires is adapted to transmit the first signal and the second signal, and another one of the two signal wires is adapted to transmit the clock signal.

In some embodiments, the two signal wires are a signal wire D+ and a signal wire D−.

In some embodiments, the signal wire D+ and the signal wire D− are disconnected with each other, when the USB charger communicates with the mobile terminal.

In some embodiments, the first signal and the second signal are pulse signals. As such, the bidirectional communication between the USB charger and the mobile terminal is achieved by way of pulse signals.

In some embodiments, the first logic control unit includes: a first logic control circuit, a first switch transistor, and a first comparator, wherein the first logic control circuit is configured to: send the first signal to the mobile terminal through the first switch transistor; receive and parse the second signal through the first comparator; and transmit the clock signal through one of the two signal wires.

According to one embodiment of the present disclosure, a mobile terminal adapted to be charged by the USB charger is provided. The mobile terminal includes a second logic control unit through which bidirectional communication is established between the mobile terminal and USB charger, wherein the second logic control unit is configured to: receive, from the USB charger, a first signal which includes a maximum output capability of the USB charger; send, to the USB charger, a second signal which indicates magnitude of a voltage requested by the mobile terminal; adjust a charging setting, when a voltage output from the USB charger is consistent with the voltage requested by the mobile terminal; and transmit a clock signal between the mobile terminal and the USB charger. In some embodiments, the magnitude of the charging temperature that the mobile terminal can handle is controlled by adjusting a threshold value of overheat protection of the mobile terminal. Therefore, the mobile terminal is suitable to be charged with more current through adjusting the charging setting correspondingly.

In some embodiments, the voltage requested by the mobile terminal is determined based on the maximum output capability of the USB charger and a maximum load capability of the mobile terminal.

In some embodiments, the bidirectional communication is established through two signal wires, wherein one of the two signal wires is adapted to transmit the first signal and the second signal, and another one of the two signal wires is adapted to transmit the clock signal.

In some embodiments, the two signal wires are a signal wire D+ and a signal wire D−.

In some embodiments, the first signal and the second signal are pulse signals.

In some embodiments, the second logic control unit includes: a second logic control circuit, a second switch transistor, and a second comparator, wherein the second logic control circuit is configured to: send the second signal to the USB charger through the second switch transistor, receive the first signal from the USB charger thorough the second comparator, and transmit the clock signal through one of the two signal wires.

According to one embodiment of the present disclosure, a method of charging a mobile terminal is provided. The method includes: sending a handshake request signal to a USB charger; receiving, from the USB charger, a first signal which includes a maximum output capability of the USB charger; sending, to the USB charger, a second signal which indicates magnitude of a voltage requested by the mobile terminal; and adjusting a charging setting of the mobile terminal when a voltage output from the USB charger is consistent with the voltage requested by the mobile terminal.

In some embodiments, the method further includes detecting a type of the USB charger.

In some embodiments, the method further includes: detecting a charging state of the mobile terminal; and adjusting a charging current when the charging state is detected abnormal.

In some embodiments, the first signal, the second signal and the handshake request signal are pulse signals.

In some embodiments, the method further includes: charging the mobile terminal with a regular voltage, when the first signal is not received from the USB charger.

According to one embodiment of the present disclosure, a method of charging a mobile terminal by a USB charger is provided. The method includes: receiving a handshake request signal from the mobile terminal; sending, to the mobile terminal, a first signal which comprises a maximum output capability of the USB charger; receiving, from the mobile terminal, a second signal which indicates magnitude of a voltage requested by the mobile terminal; and adjusting a voltage output from the USB charger to be consistent with the voltage requested by the mobile terminal.

In some embodiments, the method further comprising: charging the mobile terminal with a regular voltage, when the handshake request signal received is unable to be parsed by the USB charger.

In some embodiments, the method further comprising: charging the mobile terminal with a regular voltage, when the USB charger is disconnected with the mobile terminal.

In some embodiments, the first signal, the second signal and the handshake request signal are pulse signals.

Accordingly, the USB charger and the mobile terminal provided by the present disclosure are able to communicate with each other through a single signal wire. Thus, a bidirectional communication between the USB charger and the mobile terminal is established, wherein the bidirectional communication is achieved by way of pulse encoded signals. Accordingly, the voltage output from the USB charger is able to be intelligently controlled, and the mobile terminal is able to be charged in a fast, safe, and simply way. Two signal wires are used to establish the communication between the USB charger and the mobile terminal, one of which is for transmitting data signals and another is for transmitting a clock signal. As such, the data transmission between the USB charger and the mobile terminal is more accurate and stable. Furthermore, when the mobile terminal is not configured to be the mobile terminal as provided by the present disclosure, or the USB charger is not configured to be the USB charger as provided by the present disclosure, the mobile terminal will be charged in a regular way. Thus, the charging method provided by the present disclosure has good compatibility.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

As recited in the background, voltage drop caused by impedances of USB wires is a significant hinder of charging a mobile terminal in a large current. Therefore, the present disclosure provides a USB charger which is able to communicate with a mobile terminal by way of bidirectional communication, thus a voltage output from the charger is under control. Accordingly, the voltage output from the charger is able to be enlarged, and when the voltage output from the charger (hereafter referred to as an input voltage) is far greater than a voltage of a battery required to be charged (hereafter referred to as an output voltage), a larger charging current (hereafter referred to as an output current) is able to be obtained without enlarging a current of the charger (hereafter referred to as an input current), wherein the output current is able to be used to charge the mobile terminal. Since the output current is small, effects of the voltage drop is not significant.

In the present disclosure, the USB charger and the mobile terminal are both configured with a logic control unit for bidirectional communication therebetween. Thus, a maximum output capability of the charger can be acquired by the mobile terminal, while a maximum load capability of the mobile terminal can be acquired by the charger. It should be noted that, in some embodiments, the maximum output capability of the charger represents maximum magnitudes of voltage and current output from the USB charger, and the maximum load capability of the mobile terminal represents maximum magnitudes of voltage and current output that the mobile terminal can bear. Accordingly, the mobile terminal is able to be charged in a fast, and safety way.

According to a USB charger provided by one embodiment of the present disclosure, a first logic control unit is configured to establish a bidirectional communication between the USB charger and a mobile terminal. Specifically, the first logic control unit is adapted to: send, to the mobile terminal, a first signal which includes a maximum output capability of the USB charger; receive, from the mobile terminal, a second signal which indicates magnitude of a voltage requested by the mobile terminal; and adjust a voltage output from the USB charger to be consistent with the voltage requested by the mobile terminal. Therefore, the mobile terminal is able to be charged in a fast and safe way.

The voltage requested by the mobile terminal is determined based on the maximum output capability of the USB charger and the maximum load capability of the mobile terminal. In some embodiments, the voltage requested by the mobile terminal is the smaller one of the maximum voltage can be provided by the USB charger and the maximum voltage that the mobile terminal can bear. It should be noted that, the maximum load capability of the mobile terminal is determined by corresponding hardware thereof.

Furthermore, the first logic control unit is coupled with two signal wires of an interface of the USB charger. In other words, the USB charger and the mobile terminal communicate with each other through two signal wires of the USB charger by way of bidirectional communication. In some embodiments, the bidirectional communication is achieved through pulse signals. Specifically, the first logic control unit is adapted to receive and send pulse signals, and adjust a feedback control circuit of the USB charger to control the voltage output from the USB charger (refers to the input voltage of the charging circuit).

Figure 2:
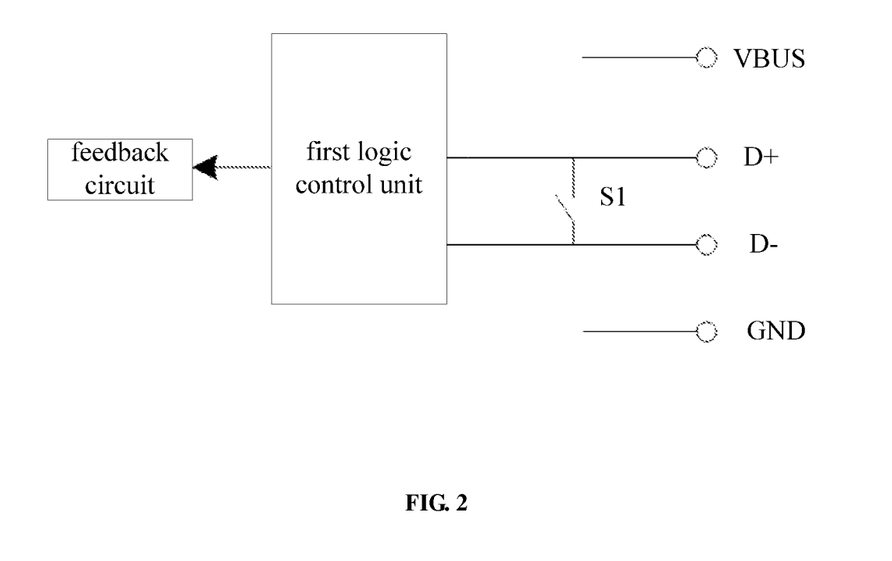
FIG. 2 schematically illustrates a diagram of a USB charger according to one embodiment of the present disclosure.

Referring to FIG. 2, a diagram of a USB charger according to one embodiment of the present disclosure is illustrated. The USB charger includes a first logic control unit which is coupled with a signal wire D+ and a signal wire D− of the USB charger. As shown in FIG. 2, a switch S1 is configured between the signal wire D+ and the signal wire D−. When the switch S1 is switched on, the signal wire D+ and the signal wire D− are connected together, thus the USB charger is a standard charger. When the switch S1 is switched off, the signal wire D+ and the signal wire D− are disconnected, thus the charging method provided by the present disclosure can be used, wherein the signal wire D+ and the signal wire D− are used to transmit data signals (e.g. the first signal and the second signal as recited below) and a clock signal, respectively. It should be noted that, in some embodiments, the USB charger may be a non-standard USB charger, in this case, an additional signal wire may be configured for being coupled with the first logic control unit. Accordingly, the signal wire coupled with the first logic control unit may be any other suitable wires besides the signal wire D+, as long as the bidirectional communication between the USB charger and the mobile terminal can be established.

The USB charger is able to be employed to charge a mobile terminal. Accordingly, a charging method is provided by the present disclosure. Specifically, if the switch S1 is switched on, the signal wire D+ and the signal wire D− are connected, thus the USB charger is determined by the mobile terminal as a standard USB charger. Thereafter, if the switch S1 is switched off, the USB charger communicates with the mobile terminal so as to receive data from the mobile terminal, the first logic control unit decodes the data received to obtain a first value. The mobile terminal receives and decodes the first value so as to pair the mobile terminal and the USB charger. Then, the mobile terminal sends a voltage to the USB charger, wherein the USB charger changes the voltage output based on the voltage requested by the mobile terminal. Finally, the mobile terminal adjusts a charging setting thereof when the voltage output from the USB charger changes. The charging setting of the mobile terminal may include magnitudes of a charging current and a charging temperature that the mobile terminal can handle. In some embodiments, the magnitude of the charging temperature that the mobile terminal can handle is controlled by adjusting a threshold value of overheat protection of the mobile terminal. Therefore, the mobile terminal is suitable to be charged with more current through adjusting the charging setting correspondingly. Accordingly, bulk charge can be achieved by enlarging the voltage output from the USB charger.

Correspondingly, a mobile terminal adapted to be charged by the USB charger as illustrated above is also provided by the present disclosure. The second logic control unit is adapted to establish a bidirectional communication with the USB charger. The second logic control unit is configured to: receive a maximum output capability of the USB charger; send a voltage requested by the mobile terminal to the USB charger, wherein the voltage requested by the mobile terminal is determined based on the maximum output capability of the USB charger; and adjust a charge setting of the mobile terminal when a voltage output from the USB charger changes, such that a bulk charge of the mobile terminal is achieved.

Specifically, the mobile terminal includes a USB interface corresponding to the interface of the USB charger. The second logic control unit is coupled with two signal wires of the USB interface of the mobile terminal. In other words, the second logic control unit communicates with the USB charger through two signal wires of the USB interface of the mobile terminal. Furthermore, the second logic control unit is adapted to receive and send pulse signals.

Figure 3:
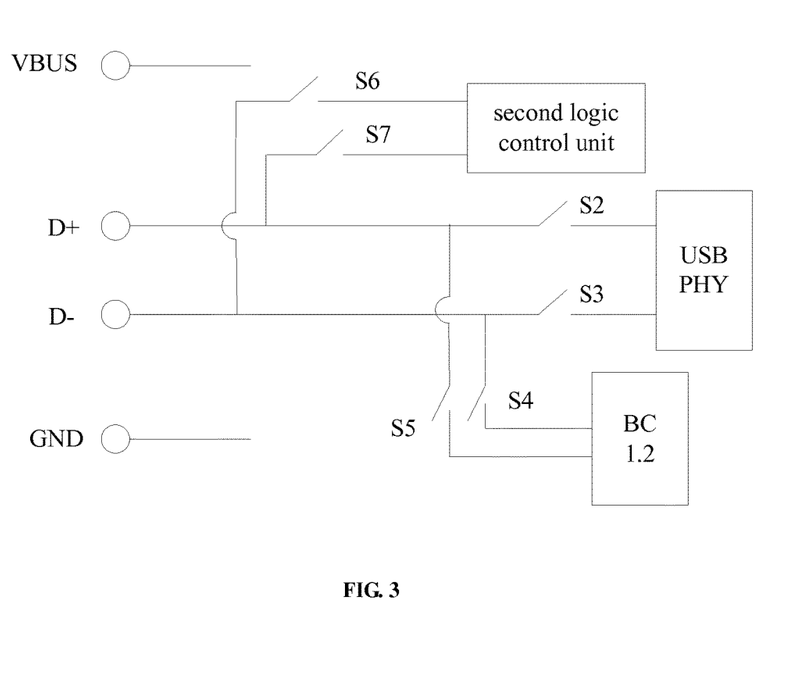
FIG. 3 schematically illustrates a diagram of a USB interface of a mobile terminal according to one embodiment of the present disclosure.

Referring to FIG. 3, a diagram of the USB interface of the mobile terminal is illustrated. As shown, the second logic control unit is coupled with a signal wire D+ and a signal wire D− of the USB interface through switches S6 and S7, respectively. Further, the signal wire D+ and the signal wire D− are coupled with BC1.2 module through switches S5 and S4, respectively. The signal wire D+ and the signal wire D− are coupled with a USB PHY module through switches S2 and S3, respectively. The USB PHY module is a common hardware structure module under regulation of the USB protocol.

In some embodiments, the mobile terminal is configured to: disconnect with the USB PHY module and the BC1.2 module, when a standard USB charger is detected being coupled with the mobile terminal; and connect with the second logic control unit for implementing a charging operation. Specifically, as shown in FIG. 3, the switches S2, S3, S4 and S5 are switched off, and the switch S6 and S7 are switched on. In this case, the second logic control unit is able to communicate with the USB charger through the signal wire D+ and the signal wire D−.

Figure 4:
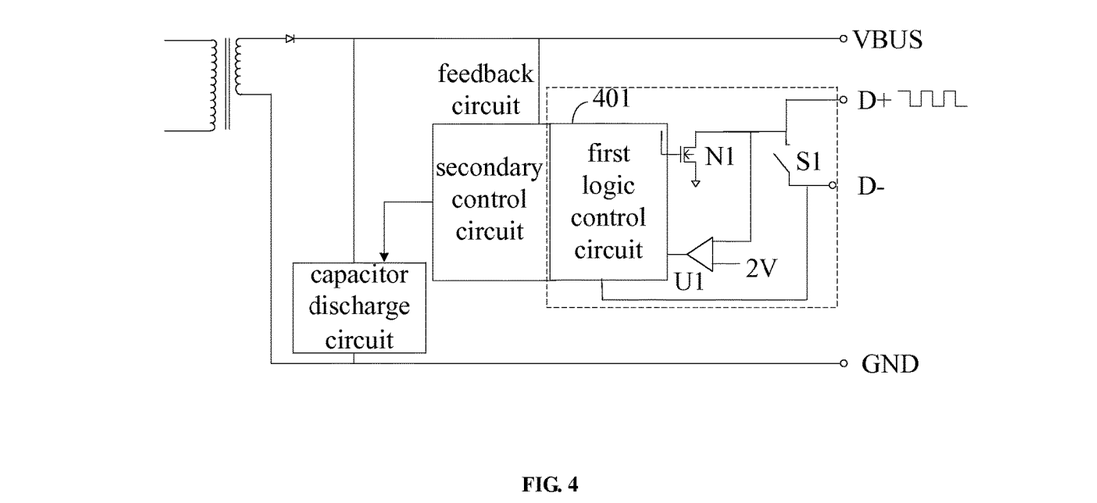
FIG. 4 schematically illustrates a circuit of a USB charger according to one embodiment of the present disclosure.
Figure 5:
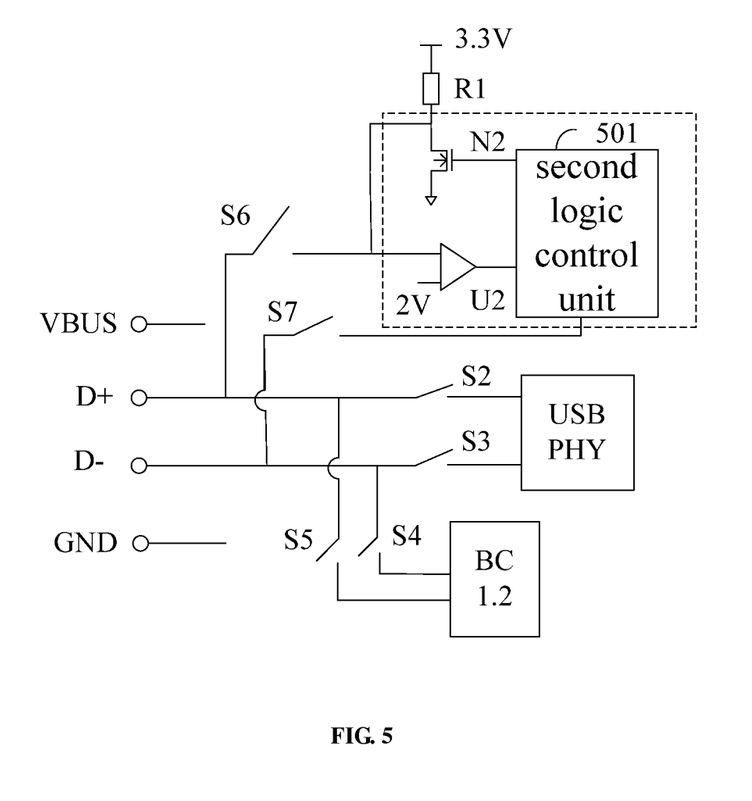
FIG. 5 schematically illustrates a circuit of a USB interface of a mobile terminal according to one embodiment of the present disclosure.

Referring to FIG. 4, a circuit structure of a USB charger according to one embodiment of the present disclosure is illustrated. Referring to FIG. 5, a circuit structure of a USB interface of a mobile terminal according to one embodiment of the present disclosure is illustrated. As shown in FIG. 4 and FIG. 5, the USB charger and the mobile terminal communicate with each other through the signal wire D+ and the signal wire D−, wherein the signal wire D+ is used to transmit data signals (e.g. the first signal and the second signal recited above), and the signal wire D− is used to transmit a clock signal. The clock signal may have a clock rate of 1 KHz. In some embodiments, the clock signal may be generated by a clock signal generator mounted in the mobile terminal. The bidirectional communication between the USB charger and the mobile terminal may include an OD (Open Drain), a pull-up resistor, and a pulsed high level of 3.3 V, wherein the pull-up resistor is configured in the mobile terminal.

Referring to FIG. 4, the first logic control unit (indicated by dashed line box in FIG. 4) includes: a first logic control circuit 401, a first switch transistor N1, and a first comparator U1. The first logic control unit is coupled with the signal wire D+ and the signal wire D− of the USB charger, and the signal wire D+ and the signal wire D− are coupled through a switch S1.

Specifically, a gate of the first switch transistor N1 is coupled with the first logic control circuit 401, a source of the first switch transistor N1 is grounded, and a drain of the first logic control circuit is coupled with the signal wire D+. The first comparator U1 has a first input terminal coupled with the signal wire D+, an output terminal coupled with the first logic control circuit 401, and a second input terminal coupled with a voltage of 2V. The first logic control circuit 401 is configured to: send a first signal (e.g. a pulse signal) to the mobile terminal through the first switch transistor N1; receive and parse a second signal (e.g. a pulse signal) through the first comparator U1; and transmit the clock signal through the signal wire D−. In some embodiments, the first signal may be used to indicate the maximum output capability of the USB charger, the second signal may be used to indicate the voltage requested by the mobile terminal.

The USB charger further includes a secondary control circuit adapted to convert alternating current with a high level into direct current with a low level such as 5V. The secondary control circuit can be implemented through ways known to person in the art, which will not be illustrated in detail herein.

Referring to FIG. 5, the second logic control unit (indicated by dashed line box) includes: a second logic control circuit 501, a second switch transistor N2, and a second comparator U2. The second logic control unit is coupled with the signal wire D+ and the signal wire D− of the USB interface through switches S6 and S7.

Specifically, a gate of the second switch transistor N2 is coupled with the second logic control circuit 501, a source of the second switch transistor N2 is grounded, and a drain of the second logic control circuit is coupled with the signal wire D+ through the switch S6 and with a pull-up resistor R1. The second comparator U2 has a first input terminal coupled with the signal wire D+ through the switch S7, an output terminal coupled with the second logic control circuit 501, and a second input terminal coupled with a voltage of 2V. The second logic control circuit 501 is coupled with the signal wire D− through the switch S7. The second logic control circuit 501 is configured to: send the second signal to the USB charger through the second switch transistor N2; receive the first signal from the USB charger; and transmit the clock signal through the signal wire D−.

As shown in FIG. 5, the BC1.2 module is adapted to determine a type of a charger coupled with the mobile terminal, wherein the BC1.2 module is a common hardware structure module under regulation of the USB protocol. By default, switches S4 and S5 of the mobile terminal are switched on, switches S2, S3, S6 and S7 of the mobile terminal are switched off, and the switch S1 of the USB charger is switched on. When a standard USB charger is detected by the BC1.2 module being coupled with the mobile terminal, the switches S4 and S5 will be switched off, and the switches S6 and S7 will be switched on. Further, the switch is switched off. Since then, the mobile terminal communicate with the USB charger through the signal wire D+ and the signal wire D−, wherein the signal wire D+ is used to transmit signals, and the signal wire D− is used to transmit the clock signal.

Referring to FIG. 4 and FIG. 5, the pull-up resistor of the signal wire D+ is configured on the mobile terminal, thus a high level of 3.3V will always exist on the signal wire D+ as long as the USB charger and the mobile terminal are coupled together. Therefore, when the voltage output from the USB charger is detected being in a low level for a preset time period, such as 1 second, the charger will be determined as being disconnected with the mobile terminal, wherein the voltage output from the USB charger is detected by the first comparator U1. In this case, for the safety usage of the USB charger, the voltage output from the USB charger should be controlled to back to 5V immediately, and a capacitor discharger circuit should be enabled to reduce the voltage output from the USB charger at once. It should be noted that, even when the USB charger and the mobile terminal are in normal communication, there is a temporary low level on the signal wire D+ for a very short time period, which should be ignored. In other words, during this very short time period, the voltage output from the USB charger should not be changed to 5V. In some embodiments, this temporary low level can be avoided by vibration reduction technologies known to person in the art.

Figure 6:
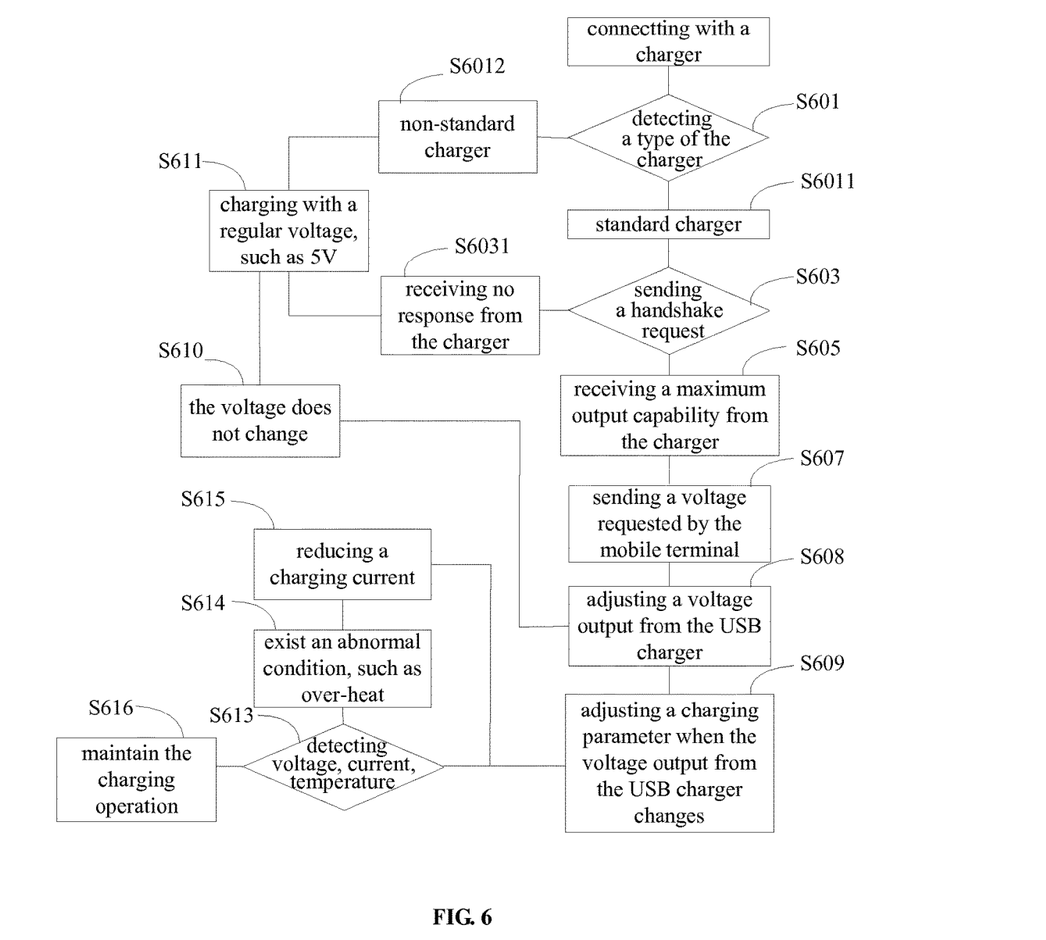
FIG. 6 schematically illustrates a flow chart of a method of charging a mobile terminal by a USB charger.

Referring to FIG. 6, a method of charging a mobile terminal is illustrated. The method which is illustrated from the aspect of the mobile terminal includes follow steps from step S601 to S616.

In step S603, sending a handshake request signal to a USB charger. In some embodiments, the handshake request signal is a pulse signal.

In step S605, receiving a first signal from the USB charger, wherein the first signal is used to inform the mobile terminal a maximum output capability of the USB charger.

In step S607, sending a second signal to the USB charger based on the first signal received, wherein the second signal is used to indicate the USB charger a voltage requested by the mobile terminal.

In step S609, when a voltage output from the USB charger is consistent with the voltage requested by the mobile terminal, adjusting a charging setting of the mobile terminal.

In some embodiments, the method may further include a step S601 before the mobile terminal sends the handshake request signal to the USB charger (S603). In step S601, detecting a type of the USB charger coupled with the mobile terminal, wherein when the USB charger is detected as a standard USB charger (S6011), S603 to S609 will be implemented.

In some embodiments, the method may further include a step S608 after the mobile terminal sends, to the USB charger, a voltage requested by the mobile terminal (S607).

In step S608, detecting if the voltage output from the USB charger is inconsistent with the voltage requested by the mobile terminal (S608).

In some embodiments, if the USB charger is detected as a non-standard USB charger (S6012), then S611 will be implemented to charge the mobile terminal with a regular voltage. In some embodiments, the regular voltage may be 5V.

In some embodiments, in step S603, if receives no response from the USB charger (S6031), when the mobile terminal sends the handshake request signal to the USB charger, then S611 will be implemented to charge the mobile terminal with the regular voltage, such as 5V. It should be noted that, no response is received may be under the following two circumstances: first, the USB charger does not include the first logic control unit and is unable to communicate with the mobile terminal by bidirectional communication, in other words, the USB charger is a regular charger; second, the USB charger is unable to parse the handshake request signal from the mobile terminal, such as because of malfunction of the USB charger. Under the above two circumstances, bidirectional communication between the USB charger and the mobile terminal is unable to be established, thus no response is received from the USB charger. Accordingly, even the USB charger coupled with the mobile terminal does not include the first logic control unit, the mobile terminal is able to be charged with regular voltage. Therefore, the mobile terminal provided by the present disclosure has a strong self-adaptability.

In some embodiments, in step S608, when the voltage output from the USB charger is inconsistent with the voltage requested by the mobile terminal (S610), step S611 will be implemented to charge the mobile terminal with the regular voltage, such as 5V.

Accordingly, in the method of charging recited above, the USB charger and the mobile terminal are able to communicate with each other by way of the bidirectional communication. Thus, the mobile terminal is able to acquire the maximum output capability of the USB charger. Therefore, the voltage output from the USB charger is able to be enlarged, so as to charge the mobile terminal by way of bulk charging.

In some embodiments, the method may further include follow steps for the safety of the charging operation.

In step S613, detecting a charging state of the mobile terminal, wherein the charging state includes at least one selected from a group consisting of a charging voltage, a charging current and a temperature.

In step S615, reducing a charging current, when the charging state is detected abnormal.

For example, when the temperature of the mobile terminal is extremely high (S614), the charging current is reduced to avoid an unsafe situation may be caused by overheat of the mobile terminal. Further, when the charging state is detected normal, the charging setting of the mobile terminal will remain unchanged (S616).

Accordingly, the method provided by the present disclosure as recited above is able to charge the mobile terminal in a fast (as bulk charging is able to be achieved) and safe way.

Figure 7:
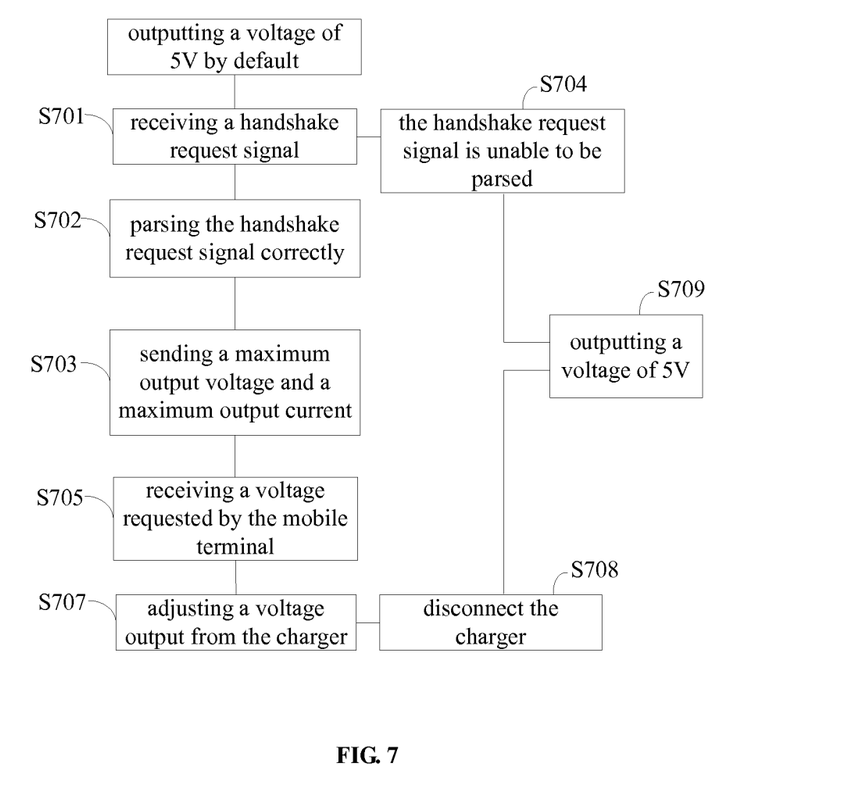
FIG. 7 schematically illustrates a flow chart of a method of charging a mobile terminal by a USB charger.

Referring to FIG. 7, a method of charging a mobile terminal according to one embodiment of the present disclosure is illustrated. The method which is illustrated from the aspect of the USB charger includes following steps from step S701 to S709.

In step S701, receiving a handshake request signal from the mobile terminal. In some embodiments, the handshake request signal is a pulse signal.

In step S703, sending a first signal to the mobile terminal, wherein the first signal is used to inform the mobile terminal a maximum output capability of the USB charger.

In step S705, receiving a second signal from the mobile terminal, wherein the second signal is used to indicate the USB charger a voltage requested by the mobile terminal.

In step S707, controlling a voltage output from the USB charger to be consistent with the voltage requested by the mobile terminal.

In some embodiments, in step S701, if the USB charger is able to parse the handshake request signal correctly (S702), then S703 will be implemented; and if the USB charger is unable to parse the handshake request signal correctly (S704), then S709 will be implemented to charge the mobile terminal with the regular voltage, such as 5V.

In some embodiments, the method may further include: if the USB charger is disconnected with the mobile terminal (S708), charging the mobile terminal under the regular charging voltage, such as 5V. It should be noted that, before the handshake request signal is received, the USB charger may charge the mobile terminal under the regular charging voltage by default.

In some embodiment, in S704, if the USB charger is unable to parse the handshake request signal correctly, the following two circumstances may exist. First circumstance is, the mobile terminal does not include the second logic control unit and is unable to communicate with the USB charger by way of bidirectional communication, in other words, the mobile terminal is a regular mobile terminal. Second circumstance is, the handshake request signal from the mobile terminal is unable to be parsed by the USB charger. Under the above two circumstances, bidirectional communication between the USB charger and the mobile terminal is unable to be established. Accordingly, even the mobile terminal coupled with the USB charger does not include the second logic control unit, the USB charger is able to charge the mobile terminal with the regular charging voltage. Therefore, the USB charger provided by the present disclosure has a strong self-adaptability.

In some embodiments, the bidirectional communication between the USB charger and the mobile terminal is established by way of pulse signal. It should be noted that, the way of bidirectional communication is not limited to the pulse signal, any other suitable way, such as fiber-optic communication, may be employed.

In some embodiments, encoding of the pulse signals may be achieved by way of A+B+C, wherein A represents an identification code with 6 bits, B represents an instruction code with 9 bits (the former 6 bits represents voltage value, and the later 3 bits represents current value), and C represents a parity bit with 1 bit.

In some embodiments of the present disclosure, the identification code is able to be defined as 011011. Thus, only a pulse started with this identification code is taken as valid. Further, an even parity is employed herein. A request pulse is able to be defined as 011011+111000111+0.

Table 1 illustrates how to encode pulse signals of different voltages and currents according to one embodiment of the present disclosure.

TABLE 1

| reserved voltage | | voltage | | current | |
|---|---|---|---|---|---|
| 3.7 V | 000000 | 5 V | 001001 | 1 A | 000 |
| 3.9 V | 000001 | 9 V | 001011 | 2 A | 001 |
| 4.1 V | 000010 | 12 V | 001101 | 3 A | 010 |
| 4.3 V | 000011 | 20 V | 001111 | 4 A | 011 |
| 4.5 V | 000100 | | | | |
| 4.7 V | 000101 | | | | |
| 5.0 V | 001001 | | | | |

It should be noted that, the Table 1 is only an example for illustrating how to encode pulse signals of different voltages and currents. In practice, some modifications may be made to the Table 1 is required.

According to the Table 1, the bulk charging between a mobile terminal and a USB charger is able to be implemented as following. It should be noted that, a maximum output voltage and a maximum output current of the USB charger are given. For example, the maximum voltage output from the USB charger is 12V, and the maximum current output from the USB charger is 2 A. Thus, the pulse is able to be defined as 001101+001 according to Table 1.

First, the mobile terminal sends a handshake request signal to the USB charger, wherein the handshake request signal is a require pulse defined as 011011+111000111+0.

When receives the require pulse defined as 011011+111000111+0, the USB charger will send 011011+001101001+0 to the mobile terminal to inform the mobile terminal that the maximum output voltage and current of the USB charger are respectively 12V and 2 A (that is, the maximum output capability of the USB charger).

When receives the maximum output capability of the USB charger (12V and 2 A), the mobile terminal will send, to the USB charger, a voltage requested by the mobile terminal. The voltage requested by the mobile terminal is able to be defined according to the Table 1. For example, if the mobile terminal sends 011011+001011+1 to the USB charger, it represents that the voltage requested by the mobile terminal is 9V. In some embodiments, the voltage requested by the mobile terminal is determined by the maximum output capability of the USB charger and the hardware of the mobile terminal (e.g. charging voltage and charging current that the mobile terminal can bear).

Then, a voltage output from the USB charger will be adjusted by the USB charger based on the voltage requested by the mobile terminal. Such as, the voltage output from the USB charger can be adjusted to be consistent with the voltage requested by the mobile terminal.

When the voltage output from the USB charger is detected being changed, the mobile terminal will adjust a charging setting thereof, such that the bulk charging is able to be achieved. The charging setting of the mobile terminal may include magnitudes of a charging current and a charging temperature that the mobile terminal can handle. Through adjusting the charging setting, the mobile terminal is suitable to be charged with more current.

Usually, the magnitude of the charging current that the mobile terminal can handle may be determined according to the smaller one of: a first pre-set bulk charging current, wherein the first pre-set bulk charging current is determined based on corresponding hardware (e.g. a battery, PCB Trace of the mobile terminal, in other words, the first pre-set bulk charging current is the maximum current that the mobile terminal can handle; and a second pre-set bulk charging current, wherein the second pre-set bulk charging current is determined based on: $I_{chg}=(P*\eta)/Z$, wherein $I_{chg}$ represents the second pre-set bulk charging current, P represents an output power of the USB charger, $\eta$ represents a conversion efficiency, and Z represents a full charged voltage of the mobile terminal. In some embodiments, the full charged voltage of the mobile terminal may be 4.2V or 4.35V.

For example, supposing a DCDC loss is 20%, a line loss is 10%, the full charged voltage of the mobile terminal is 4.2V, thus the second pre-set bulk charging current $I_{chg}=$ (P*70%)/4.2V.

Accordingly, the USB charger and the mobile terminal provided by the present disclosure are able to communicate with each other through the signal wire D+ and the signal wire D−. Thus, a bidirectional communication between the USB charger and the mobile terminal is established, wherein the bidirectional communication is achieved by way of specific pulse signals. Accordingly, the voltage output from the USB charger is able to be intelligently controlled, and the mobile terminal is able to be charged in a fast, safe, and simply way. Two signal wires are used to establish the communication between the USB charger and the mobile terminal, one of which is for transmitting data signals and another is for transmitting a clock signal. As such, the data transmission between the USB charger and the mobile terminal is more accurate and stable. Furthermore, when the mobile terminal is not configured to be the mobile terminal as provided by the present disclosure, or the USB charger is not configured to be the USB charger as provided by the present disclosure, the mobile terminal will be charged in a regular way. Thus, the charging method provided by the present disclosure has good compatibility.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A USB charger adapted to charge a mobile terminal, comprising a first logic control unit through which bidirectional communication is established between the USB charger and the mobile terminal,
   wherein the first logic control unit is configured to: send, to the mobile terminal, a first signal which indicates a maximum output capability of the USB charger; receive, from the mobile terminal, a second signal which indicates magnitude of a voltage requested by the mobile terminal; adjust a voltage output from the USB charger to be consistent with the voltage requested by the mobile terminal; and transmit a clock signal between the USB charger and the mobile terminal,
   the bidirectional communication is established through two signal wires, wherein one of the two signal wires is used to transmit the first signal and the second signal, while another one of the two signal wires is used to transmit the clock signal, and
   the first logic control unit comprises: a first logic control circuit, a first switch transistor, and a first comparator, wherein the first logic control circuit is configured to: send the first signal to the mobile terminal through the first switch transistor, receive and parse the second signal through the first comparator; and transmit the clock signal through one of the two signal wires.

2. The USB charger according to claim 1, wherein the voltage requested by the mobile terminal is determined based on the maximum output capability of the USB charger and a maximum load capability of the mobile terminal.

3. The USB charger according to claim 1, wherein the two signal wires are a signal wire D+ and a signal wire D−.

4. The USB charger according to claim 3, wherein the signal wire D+ and the signal wire D− are disconnected with each other, when the USB charger communicates with the mobile terminal.

5. The USB charger according to claim 1, wherein the first signal and the second signal are pulse signals.

6. A mobile terminal, comprising a logic control unit through which bidirectional communication is established between the mobile terminal and a USB charger,
wherein the logic control unit is configured to: receive, from the USB charger, a first signal which indicates a maximum output capability of the USB charger; send, to the USB charger, a second signal which indicates magnitude of a voltage requested by the mobile terminal; adjust a charging setting, when a voltage output from the USB charger is consistent with the voltage requested by the mobile terminal; and transmit a clock signal between the USB charger and the mobile terminal,
the bidirectional communication is established through two signal wires, wherein one of the two signal wires is adapted to transmit the first signal and the second signal, while another one of the two signal wires is adapted to transmit the clock signal, and
the logic control unit comprises: a second logic control circuit, a second switch transistor, and a second comparator, wherein the second logic control circuit is configured to: send the second signal to the USB charger through the second switch transistor; receive the first signal from the USB charger through the second comparator; and transmit the clock signal through one of the two signal wires.

7. The mobile terminal according to claim 6, wherein the voltage requested by the mobile terminal is determined based on the maximum output capability of the USB charger and a maximum load capability of the mobile terminal.

8. The mobile terminal according to claim 6, wherein the two signal wires are a signal wire D+ and a signal wire D−.

9. The mobile terminal according to claim 6, wherein the first signal and the second signal are pulse signals.

* * * * *